United States Patent [19]

Mykolenko

[11] 3,727,939

[45] Apr. 17, 1973

[54] VEHICLE SUSPENSION CONTROL ARM

[75] Inventor: Petro Mykolenko, Warren, Mich.

[73] Assignee: General Motors Corporation, Detroit, Mich.

[22] Filed: June 23, 1971

[21] Appl. No.: 155,896

[52] U.S. Cl. ............................. 280/124 R, 267/52
[51] Int. Cl. .............................................. B60g 7/00
[58] Field of Search .................. 267/52, 15 A, 15 R, 267/20 R, 20 A, 21 R, 60; 180/73; 280/124 R

[56] References Cited

UNITED STATES PATENTS 3,601,426  8/1971  Hury ..................................... 280/124

Primary Examiner—Philip Goodman
Attorney—W. E. Finken et al.

[57] ABSTRACT

A control arm particularly adapted for use in a vehicle suspension system includes a pair of spaced, parallel sides having aligned circular apertures therein, rigid inturned flanges extending around each of the apertures, and a sleeve disposed between the sides and in register with the apertures and with the flanges being closely received within the sleeve. A rubber bushing is received in the passage defined by the sleeve and the flanges and forces exerted on the control arm by the bushing are resisted partially by the portions of the flanges directly engaging the bushing and partially by the remaining portions of the flanges through the sleeve so that an even distribution of force across the control arm is achieved.

3 Claims, 6 Drawing Figures

PATENTED APR 17 1973

3,727,939

INVENTOR.
Petro Mykolenko
BY
Saul Schwartz
ATTORNEY

VEHICLE SUSPENSION CONTROL ARM

This invention relates generally to a vehicle suspension system and more particularly to an improved control arm adapted for use therein.

In an automobile having a typical coil spring rear suspension, the frame or sprung mass of the vehicle is supported on the axle housing or unsprung mass of the vehicle by a pair of laterally spaced coil springs. The path of movement of the unsprung mass relative to the sprung mass is normally dictated by two pairs of control arms, one pair being located on each side of the longitudinal centerline of the vehicle and including an upper arm and a lower arm. The control arms function, in addition to controlling the position of the sprung mass relative to the unsprung mass, to resist the torque reactions experienced by the axle housing during braking and acceleration of the vehicle. In the past, opposite ends of each control arm have been pivotally connected to the frame and to the axle housing through rubber bushing assemblies pressed into apertures in the sides of the control arm. In such a construction, the bushing apertures substantially weaken the tensile load carrying capability of the control arm and thus require the use of heavier gauge material in fabricating the control arm. A control arm constructed in accordance with this invention exhibits none of the strength reduction heretofore coincident with the addition of bushing apertures to control arms and is particularly adapted for simple and economical manufacture.

The primary feature of this invention is that it provides a new and improved control arm particularly adapted for use in vehicle suspension systems. Another feature of this invention is that it provides a new and improved control arm having a pair of spaced bushing receiving apertures and a bushing sleeve disposed between the apertures, the sleeve and control arm being connected by an interlocking flange arrangement which effectively eliminates the strength reduction heretofore caused by the apertures. A still further feature of this invention resides in the provison of an interlocking flange arrangement wherein rigid inturned flanges around each bushing aperture are closely received within the bushing sleeve so that forces applied to the control arm by a bushing received in the passage defined by the flanges and the sleeve are resisted partially by the portions of the flanges in directc contact with the bushing and partially by the remaining portions of the flanges through the sleeve, the forces thus being more evenly distributed for improved strength.

These and other features of this invention will be readily apparent from the following specification and from the drawings wherein.

Figure 1:
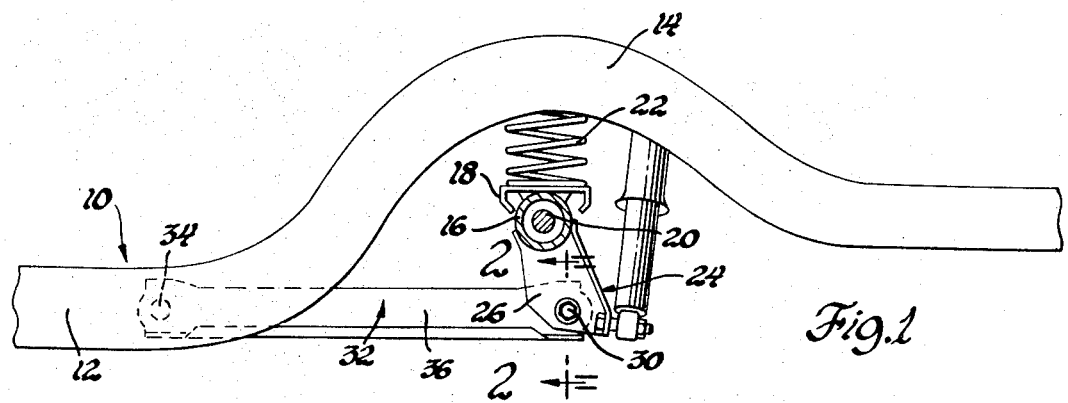
FIG. 1 is a side elevational view of an automotive coil spring rear suspension system incorporation a control arm constructed in accordance with this invention.

Referring now to FIG. 1 of the drawings, there is shown the rear portion of an automobile frame designated generally 10 including a left longitudinally extending left side rail 12 defining an arch 14, the frame further including a similar longitudinally extending right side rail, not shown, rigidly connected to the rail 12 by a plurality of cross members. A conventional axle housing 16 extends laterally beneath the arch 14 and has rigidly attached thereto beneath rail 12 a spring seat 18, a similar spring seat, not shown, being attached to the axle housing beneath the right side rail. An axle shaft 20 is rotatably journaled in the housing 16 and carries at its outboard end a left rear road wheel of the vehicle, not shown, the right rear road wheel being supported in a similar manner on the right side of the axle housing. A coil spring is disposed between each spring seat on the axle housing and a similar spring seat, not shown, on the corresponding one of the rails, only left coil spring 22 being shown in FIG. 1. The frame or sprung mass of the vehicle is thus resiliently supported above the axle housing or unsprung mass of the vehicle in a conventional manner.

The path of movement of the axle housing relative to the frame is dictated by a plurality of control arms disposed between the frame and the axle housing in a conventional manner. Typically, such an arrangement includes a pair of upper control arms located symmetrically with respect to the longitudinal centerline of the vehicle, each control arm being pivotally supported on the frame and pivotally connected to the axle housing at some point above the horizontal centerline thereof. The typical arrangement further includes a pair of lower control arms similarly symmetrically disposed on opposite sides of the frame and pivotally connected to the latter and to the axle housing at a point on the latter below the horizontal centerline thereof. Since a control arm constructed in accordance with this invention is adapted for use in any or all of the above noted positons, only the left side lower control arm is shown in FIG. 1 and will be described hereinafter.

Figure 2:
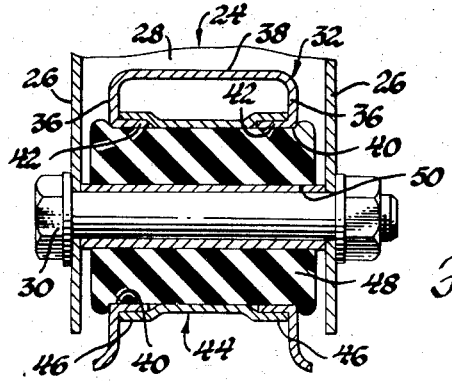
FIG. 2 is an enlarged sectional view taken generally along the plane indicated by lines 2—2 in FIG. 1.

As best seen in FIGS. 1 and 2, a bracket 24 including a pair of parallel vertical sides 26 interconnected by a web portion 28 is rigidly attached, as by welding, to the axle housing and projects generally vertically downward therefrom. A bolt 30 is rigidly supported on the bracket 24 in generally parallel relation to the axle housing and spans the distance between the vertical sides 26. The bolt 30 rotatably supports in a manner to be described hereinafter the trailing end of a control arm 32 constructed in accordance with this invention, the leading end of the control arm being similarly rotatably supported on the frame adjacent the rail 12 at 34. As the axle housing moves relative to the frame during normal springing action, the bolt 30 is swung in an arc about pivot 34. During braking and acceleration of the vehicle the torque applied to the axle housing is resisted in either tension or compression by the control arm 32 in a well-known manner.

Figure 3:
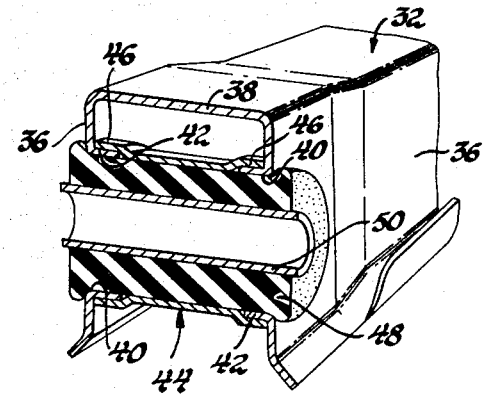
FIG. 3 is a perspective view of a portion of a control arm constructed in accordance with this invention and vertically sectioned along the plane indicated by lines 2—2 in FIG. 1.

Referring now to FIGS. 2 and 3, the control arm 32 has a generally channel-shaped configuration and includes a pair of vertical longitudinally extending sides 36 interconnected in parallel and spaced relation by a web 38. Generally adjacent the trailing edge of the control arm, each side 36 thereof has formed therein a circular aperture 40, the apertures being equal in diameter and axially aligned on a transverse axis of the control arm. An inturned annular flange 42 integral with the corresponding side 36 of the control arm extends around each of the apertures 40 in generally rigid and perpendicular relation to the corresponding side.

A sleeve 44 of length generally equal to the distance between the sides 36 of the control arm has an inside diameter generally equal to the diameter of apertures 40 and includes a pair of annular receptacle portions 46 at each end thereof having an inside diameter larger than the inside diameter of the sleeve. The sleeve 44 is disposed between the sides 36 of the control arm with the inturned flanges 42 projecting into the receptacle portions 46. The inside diameter of the receptacle portions is greater than the inside diameter of the sleeve by an amount generally equal to twice the thickness of the inturned flanges 42 so that when the sleeve is disposed between the sides of the control arm a relatively tight fit is achieved between the flanges and the sleeve with the former and the latter cooperating in defining a cylindrical passage of constant diameter through the control arm.

As seen best in FIGS. 2 and 3, the passage thus defined by the sleeve 44 and flanges 42 is adapted to receive a cylindrical rubber bushing 48 having fitted through a central bore thereof a bearing sleeve 50. The beraing sleeve bearing is rotatably disposed about the shank of bolt 30 between the sides 26 of the bracket 24 thereby to resiliently pivotally connect the control arm to the axle housing.

Figure 6:
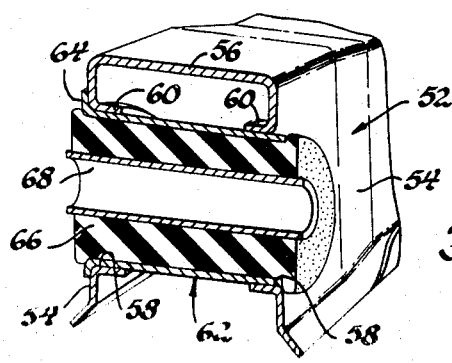
FIG. 6 is a perspective view similar to FIGS. 3 and 5 of a conventional control arm construction.

Referring to FIG. 6, a conventionally constructed control arm 52 is thereshown, the arm 52 having a channel-shaped configuration including a pair of vertical sides 54 interconnected by a web 56. A pair of aligned bushing apertures 58 are formed in respective ones of the sides 54, each aperture having a rigid inturned flange 60 extending therearound. A bushing sleeve 62 having a flange 64 at one end thereof is closely received within the aligned apertures 58, the sleeve 62 being adapted to receive a rubber bushing 66 having a bearing sleeve 68 therein for pivotally connecting the control arm 52 to the bracket 24 as described with respect to control arm 32.

Comparing, now, the performance of control arm 32 with the performance of conventional control arm 52 and assuming torque is applied to axle housing 16 tending to rotate the latter counterclockwise, FIG. 1, the particular control arm installed on the vehicle resists, in tension through the corresponding bushing, the tendency of bolt 30 to move rearwardly. More precisely, the bolt 30 places generally the rearward half of the rubber bushing in compression against the corresponding half of the control arm passage through which the bushing extends. In the case of conventional control arm 52, the sleeve 62 and the bushing 66 are supported by the flanges 60 as a simple beam at the opposite ends of the sleeve so that the full load imposed by the bushing is resisted across the minimum cross sectional area of the control arm, the minimum area, of course, occurring in a vertical plane through the transverse axis of the control arm on which the apertures 58 are aligned. Accordingly, the unit tensile stress experienced by the control arm is maximum at this minimum area and dictates the thickness of the sheet metal from which the entire control arm is to be fabricated.

In control arm 32, however, the sleeve 44 effectively functions as an integral part of the control arm rather than merely a bridge between the flanges around the bushing apertures. As seen best in FIGS. 2 and 3, the bushing 48 is directly partially supported at its opposite ends as a simple beam by the flanges 42 so that a portion of the load imposed by the bushing is resisted across the minimum cross sectional area of the control arm as described hereinbefore with respect to control arm 52. The remaining portion of the bushing 48 between the flanges 42 is supported by the sleeve 44 which is locked to flanges 42 so that the force exerted on the sleeve is resisted by the outside surface of the flanges 42 around the forward half of the apertures 40. The resulting force on the outside surfaces of the flanges is resisted across a cross sectional area of the control arm 32 equal to twice the diameter of the apertures 40 multiplied by the thickness of the material from which the control arm is fabricated. This area is, of course, equal to the area which was heretofore effectively eliminated from the control arm by the presence of the bushing apertures. It follows, then, that for any given tensile load applied to both control arms 32 and 52, the maximum unit stress occurring at the vertical plane through the axis of the aligned apertures will be lower in control arm 32 because only a portion of the load is carried across the minimum cross section as compared with the entire load being carried thereacross in control arm 52. The construction of control arm 32 thus permits the use of thinner sheet metal in the fabrication of the control arm which, of course, effects a substantial cost reduction when a large number of control arms are involved.

Figure 4:
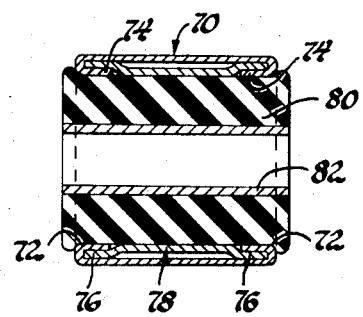
FIG. 4 is a view similar to FIG. 1 of a modified control arm constructed in accordance with this invention.
Figure 5:
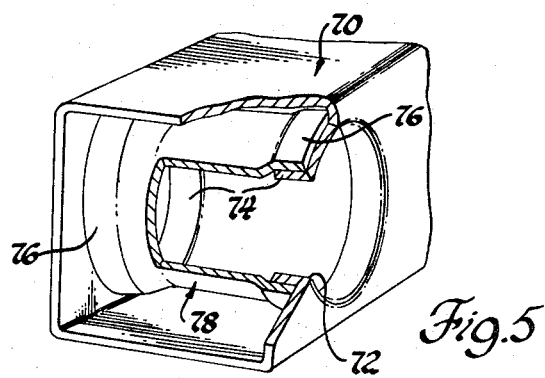
FIG. 5 is a fragmentary perspective view similar to FIG. 3 of the modified control arm.

Referring now to FIGS. 4 and 5, an alternative embodiment of the invention is thereshown in the form of a control arm 70 fabricated from commercially available square tube cut to a predetermined length. The tube has a pair of aligned circular apertures 72 formed therein with respective ones of a pair of integral inturned flanges 74 extending therearound. Each flange 74 is received within a corresponding one of a pair of cylindrical receptacle portions 76 of a sleeve 78 disposed between the sides of the tube having the apertures 72 formed therein. The passage formed by the sleeve 78 and the flanges 74 receives a rubber bushing 80 carrying a bearing sleeve 82 adapted for reception of bolt 30 as described hereinbefore. It will be appparanet to those skilled in the art that the control arm 70 is capable of even more economical manufacture than control arm 32 because the main body of the control arm requires no fabrication other than the perforation of the apertures 72 and the fabrication of the flanges 74. The performance of the control arm 70 is, of course, identical to the performance of control arm 32.

Having thus described the invention, what is claimed is:

1. In a control arm having a pair of spaced parallel wall portions extending longitudinally of said control arm, the combination comprising, means defining an aperture in each of said wall portions of said control arm, said apertures being identical in configuration and aligned on a transverse axis of said control arm, a sleeve having an internal configuration corresponding to the configuration of said aligned apertures and a length substantially equal to the distance between said wall portions of said control arm, said sleeve being disposed between said wall portions in register with each of said aligned apertures, and means on said control arm defining rigid flanges around at least a portion of the perimeter of each of said aligned apertures, each of said flanges extending inwardly into said sleeve in generally perpendicular relation to the corresponding one of said wall portions and engaging a corresponding portion of the internal surface of said sleeve thereby to secure said sleeve against bodily movement relative to said control arm longitudinally of the latter.

2. In a control arm having a pair of spaced parallel and transverse extending wall portions interconnected by a web portion coextensive with said wall portions, the combination comprising, means defining a circular aperture in each of said wall portions of said control arm, said apertures being of equal diameter and aligned on a longitudinal axis of said control arm, a cylindrical sleeve of length substantially equal to the distance between said wall portion, said sleeve having an internal diameter equal to the diameter of said aligned apertures and a receptacle portion at each end thereof of larger inside diameter, said sleeve being disposed between said wall portions in register with said aligned apertures, and means on said control arm defining a flange around the circumference of each of said aligned apertures, each of said flanges extending inwardly into a corresponding one of said receptacle portions of said sleeve in generally perpendicular relation to the corresponding one of said wall portions and being of thickness generally equal to one half of the difference between the inside diameter of said sleeve and the inside diameter of said receptacle portions thereof so that said sleeve is rigidly secured to said control arm and said flanges define with said sleeve a substantially constant diameter transverse passage through said control arm.

3. A control arm comprising, an elongated hollow tubular member square in cross section with four integral longitudinally extending sides, said four sides defining two pairs of a parallel spaced longitudinally extending wall portions, means on said tubular member defining a flanged circular aperture in each wall portion of one of said two pairs of wall portions, each of said flanged apertures being equal in diameter and aligned on a transverse axis of said tubular member adjacent one end thereof and said flanges extending inward in generally perpendicular relation to the corresponding one of said wall portions, a hollow cylindrical sleeve having an inner diameter generally equal to the diameter of said flanged apertures and a pair of cylindrical receptacle portions at opposite ends thereof each having an inner diameter exceeding the inner diameter of said sleeve by an amount equal to two times the thickness of said flanges around said apertures, said sleeve having a length substantially equal to the distance between said one pair of wall portions, and means disposing said sleeve between the wall portions of said one pair of wall portions in register with said apertures and with each of said flanges being closely received in a corresponding one of said receptacle portions of said sleeve so that the latter is rigidly secured to said tubular member and defines with said flanges a substantially constant diameter transverse passage through said tubular member.

* * * * *